US012742580B2

(12) United States Patent
Shin

(10) Patent No.: US 12,742,580 B2
(45) Date of Patent: Sep. 22, 2026

(54) FEED TANK EQUIPPED WITH PACKING STRUCTURE OF FLOAT SENSOR AND ICE MAKER INCLUDING THE SAME

(71) Applicant: BLUENIX Co., Ltd., Ansan-si (KR)

(72) Inventor: Seung Jin Shin, Siheung-si (KR)

(73) Assignee: BLUENIX Co., Ltd., Ansan-si (KR)

( * ) Notice: Subject to any disclaimer, the term of this patent is extended or adjusted under 35 U.S.C. 154(b) by 68 days.

(21) Appl. No.: 18/757,849

(22) Filed: Jun. 28, 2024

(65) Prior Publication Data

US 2025/0146728 A1 May 8, 2025

(30) Foreign Application Priority Data

Nov. 7, 2023 (KR) ........................ 10-2023-0152778

(51) Int. Cl.
*F25C 1/25* (2018.01)
*F25C 1/147* (2018.01)
*G01F 23/30* (2006.01)

(52) U.S. Cl.
CPC ................ *F25C 1/25* (2018.01); *F25C 1/147* (2013.01); *G01F 23/30* (2013.01); *F25C 2400/14* (2013.01); *F25C 2500/06* (2013.01); *F25C 2700/04* (2013.01)

(58) Field of Classification Search
CPC ........ F25C 1/147; F25C 1/25; F25C 2400/14; F25C 2500/06; F25C 2700/04; G01F 23/30
See application file for complete search history.

(56) References Cited

U.S. PATENT DOCUMENTS

2007/0006606 A1* 1/2007 Kaga ........................ F25C 5/142 62/135
2020/0041187 A1 2/2020 Huckaby et al.
2021/0222937 A1* 7/2021 Knatt ........................ F25C 1/10

FOREIGN PATENT DOCUMENTS

| | | | |
|---|---|---|---|
| JP | 3741878 | B2 | 2/2006 |
| JP | 2020-038048 | A | 3/2020 |
| JP | 2022-122473 | A | 8/2022 |
| KR | 20-1995-0012271 | U | 5/1995 |
| KR | 10-2018-0075359 | A | 7/2018 |

OTHER PUBLICATIONS

CN 114597701 (English translation) (Year: 2022).*
JP 2004-101108 (English translation) (Year: 2004).*

* cited by examiner

*Primary Examiner* — Jonathan Bradford
(74) *Attorney, Agent, or Firm* — Renner, Otto, Boisselle & Sklar, LLP

(57) ABSTRACT

A feed tank equipped with a packing structure of a float sensor which may be easily assembled and separated and maintain a sealed state for contamination prevention and waterproofing and an ice maker including the same are provided. The feed tank equipped with a packing structure of a float sensor includes a feed tank including a storage portion provided with a storage space in which ice-making water is stored, a cover portion unit detachably coupled to an upper surface of the storage portion, and a packing portion including a hollow packing member provided to penetrate through one surface of the cover portion and a fixing member extending in a spiral direction along at least a portion of an inner circumferential surface of the packing member and a float sensor inserted into the packing portion and detecting a level of the ice-making water.

12 Claims, 6 Drawing Sheets

( a )

( b )

FEED TANK EQUIPPED WITH PACKING STRUCTURE OF FLOAT SENSOR AND ICE MAKER INCLUDING THE SAME

CROSS-REFERENCE TO RELATED APPLICATION(S)

This application claims benefit of priority to Korean Patent Application No. 10-2023-0152778 filed on Nov. 7, 2023 in the Korean Intellectual Property Office, the disclosure of which is incorporated herein by reference in its entirety.

BACKGROUND

1. Field

The present disclosure relates to a feed tank equipped with a packing structure of a float sensor and an ice maker including the same.

2. Description of Related Art

An ice maker is a device that produces ice and supplies ice to users.

In general, an auger-type ice maker allows a cold refrigerant to flow into a refrigerant pipe on an outer wall of a cylinder, causing water inside the cylinder to freeze and produce thin ice on an inner wall of the cylinder, and here, the produced ice is scraped off as an auger rotates and transferred to the top to be compressed and cut. Thereafter, the produced ice is delivered to a storage tank and stored.

The ice maker includes a float sensor to control a water level of a feed tank supplying ice-making water. The related art float sensors may be separated to the outside, but without a sealing structure, the related art float sensors are vulnerable to contamination, and when a problem occurs in controlling the supply of ice-making water, the ice-making water may overflow out of the feed tank. In addition, since the float sensor is coupled to the feed tank with a bolt and nut type connection, it may be difficult to separate without tools, and in order to separate the float sensor, there may be difficulties in that the float sensor should be removed and assembled using tools on the opposite side after unsealing of the feed tank.

SUMMARY

An aspect of the present disclosure is to provide a feed tank equipped with a packing structure of a float sensor which may be easily assembled and separated and maintain a sealed state for contamination prevention and waterproofing, and an ice maker including the same.

According to an aspect of the present disclosure, a feed tank equipped with a packing structure of a float sensor includes: a feed tank including a storage portion provided with a storage space in which ice-making water is stored, a cover portion unit detachably coupled to an upper surface of the storage portion, and a packing portion including a hollow packing member provided to penetrate through one surface of the cover portion and a fixing member extending in a spiral direction along at least a portion of an inner circumferential surface of the packing member; and a float sensor inserted into the packing portion and detecting a level of the ice-making water.

The float sensor may be rotated to be fixed to or separated from the packing portion.

The fixing member may be provided to surround a portion of an outer circumferential surface of the float sensor inside the packing member.

The fixing member may include a protrusion provided at one end connected to the packing member and protruding toward the storage space.

The fixing member further may include a fixing hook extending in the spiral direction from the one end toward the outside facing the storage space, wherein the fixing hook is provided separately from the packing member.

The float sensor may include: a head portion provided inside the packing portion; a body portion extending from the head portion within the storage space; and a lifting portion coupled to the body portion and raised and lowered according to the level of the ice-making water in the storage space, wherein the packing portion is provided to surround the head portion.

The float sensor may further include a handle portion provided above the head portion to cover portion an open upper surface of the packing member and having an extended handle.

The head portion may further include an arresting member provided on an outer surface thereof and including an arresting recess to allow the protrusion to be inserted into and caught therein.

The head portion may further include a support member provided on the outer surface thereof and contacting an end of the fixing hook so that the fixing hanger is supported.

The float sensor may further include: a sealing recess formed on the outer surface of the head portion; and a sealing member provided in the sealing recess.

According to another aspect of the present disclosure, an ice maker includes: an ice generating unit generating ice by exchanging heat with a refrigerant; an ice storage portion storing ice produced in the ice generating unit; and the feed tank equipped with a packing structure of a float sensor described above, which receives ice-making water from a water source through a water supply pipe, stores received ice-making water, and supplies the stored ice-making water to the ice generating unit.

The ice generating unit may include: a hollow cylinder; an auger coaxially provided and rotating the cylinder inside the cylinder; and a refrigerant pipe formed to surround an outer circumferential surface of the cylinder and including a refrigerant inlet formed at one end and a refrigerant outlet formed at the other end with respect to a height direction of the cylinder.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
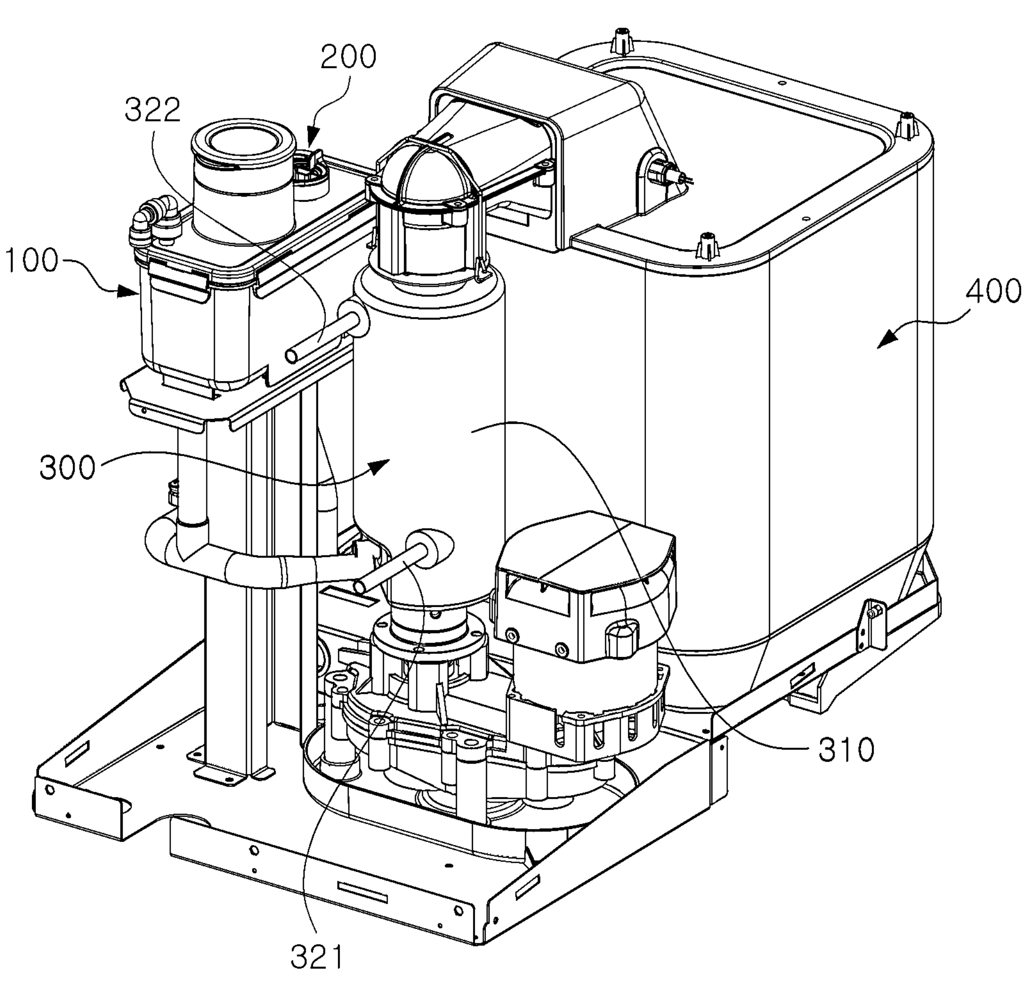
FIG. 1 is a schematic perspective view of an ice maker according to an exemplary embodiment of the present disclosure.

Hereinafter, exemplary embodiments of the present disclosure will be described in detail with reference to the accompanying drawings. The disclosure may, however, be exemplified in many different forms and should not be construed as being limited to the specific exemplary embodiments set forth herein, and those skilled in the art and understanding the present disclosure may easily accomplish retrogressive inventions or other exemplary embodiments included in the scope of the present disclosure by the addition, modification, and removal of components within the same scope, but those are construed as being included in the scope of the present disclosure.

In addition, throughout the specification, that a component is 'connected' to another component includes not only cases in which these components are 'directly connected' but also 'indirectly connected' through other components. In addition, 'including' a certain component means that other components may be further included, rather than excluding other components, unless otherwise stated.

Further, like reference numerals will be used to designate like components having similar functions throughout the drawings within the scope of the present disclosure.

FIG. 1 is a schematic perspective view of an ice maker 10 according to an exemplary embodiment of the present disclosure.

The ice maker 10 according to an exemplary embodiment of the present disclosure includes a feed tank equipped with a packing structure of a float sensor according to an exemplary embodiment of the present disclosure, an ice generating unit 300 generating ice by exchanging heat with a refrigerant, and an ice storage portion 400 storing the ice generated by the ice generating unit 300. The feed tank equipped with a packing structure of a float sensor according to an exemplary embodiment of the present disclosure includes a feed tank 100 and a float sensor 200 according to an exemplary embodiment of the present disclosure and receives ice-making water through a water supply pipe 121 from a water source (not shown), stores the ice-making water, and supplies the stored ice-making water to the ice generating unit 300 through a supply hole **112*h* (see FIG. 5**). The feed tank equipped with a packing structure of a float sensor according to an exemplary embodiment of the present disclosure is described below.

The ice generating unit 300 may include a hollow cylinder (not shown) provided inside an ice generating pipe 310 and to which the ice-making water is transferred, an auger (not shown) coaxially provided and rotating with the ice generating pipe 310 inside the cylinder (not shown), and a refrigerant pipe (not shown) provided between an outer circumferential surface of the cylinder (not shown) and the ice generating pipe 310. Accordingly, in the ice generating unit 300 according to an exemplary embodiment of the present disclosure, as the auger (not shown) rotates, the ice generated inside the cylinder (not shown) may be transferred to one end of the ice generating pipe 310. Meanwhile, the refrigerant pipe (not shown) may have a refrigerant inlet 321 connected to one end of the ice generating pipe 310 and a refrigerant outlet 322 connected to the other end of the ice generating unit 310. Meanwhile, the ice storage portion 400 may be a square-shaped container and may include an ice storage space (not shown) in which ice is stored, and the hardened ice transferred to one end of the ice generating pipe 310 may be transferred to and stored in an ice storage space (not shown).

Referring to the related art ice makers, a sealing structure is not applied in coupling a float sensor to the feed tank, which is vulnerable to contamination, and when a problem occurs in controlling the supply of ice-making water, the ice-making water overflows out of the feed tank, and it is not easy to assemble and separate the float sensor. Based on the recognition of the problems, the ice maker 10 according to an exemplary embodiment of the present disclosure includes a feed tank equipped with a packing structure of a float sensor according to an exemplary embodiment of the present disclosure, and thus, it is easy to assemble and separate the float sensor 200, and a sealed state for contamination prevention and waterproofing may be maintained.

Figure 2:
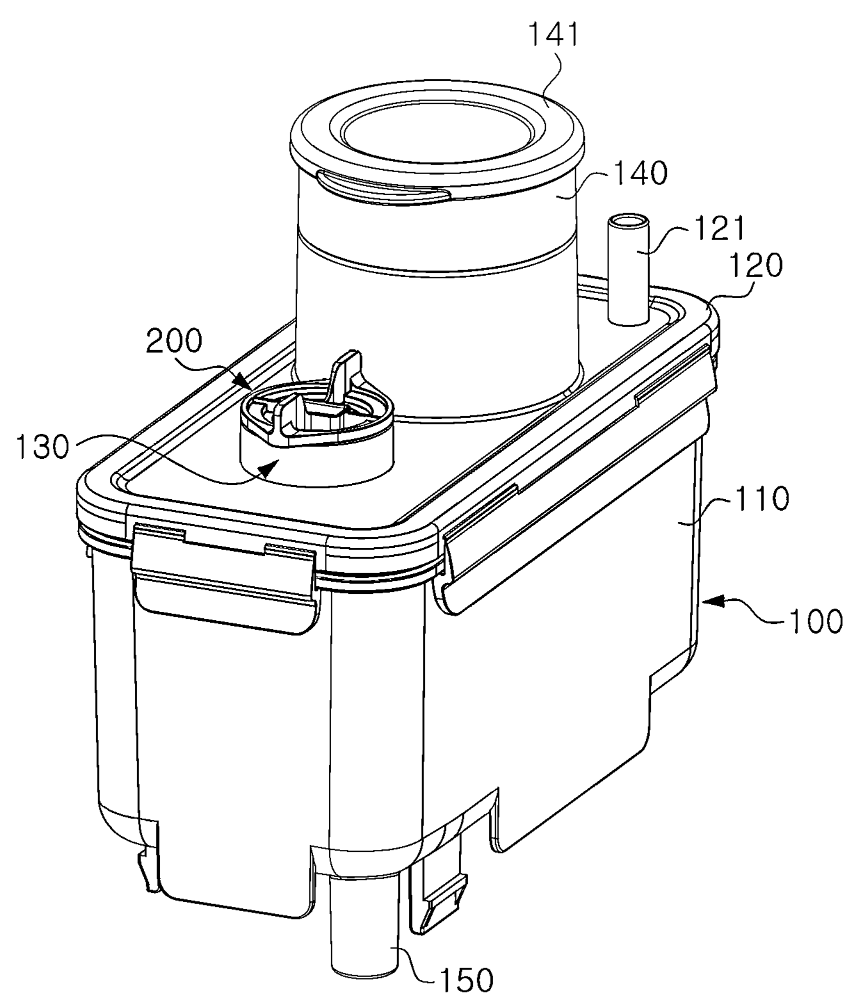
FIG. 2 is a schematic perspective view of a feed tank equipped with a packing structure of a float sensor according to an exemplary embodiment of the present disclosure.
Figure 3:
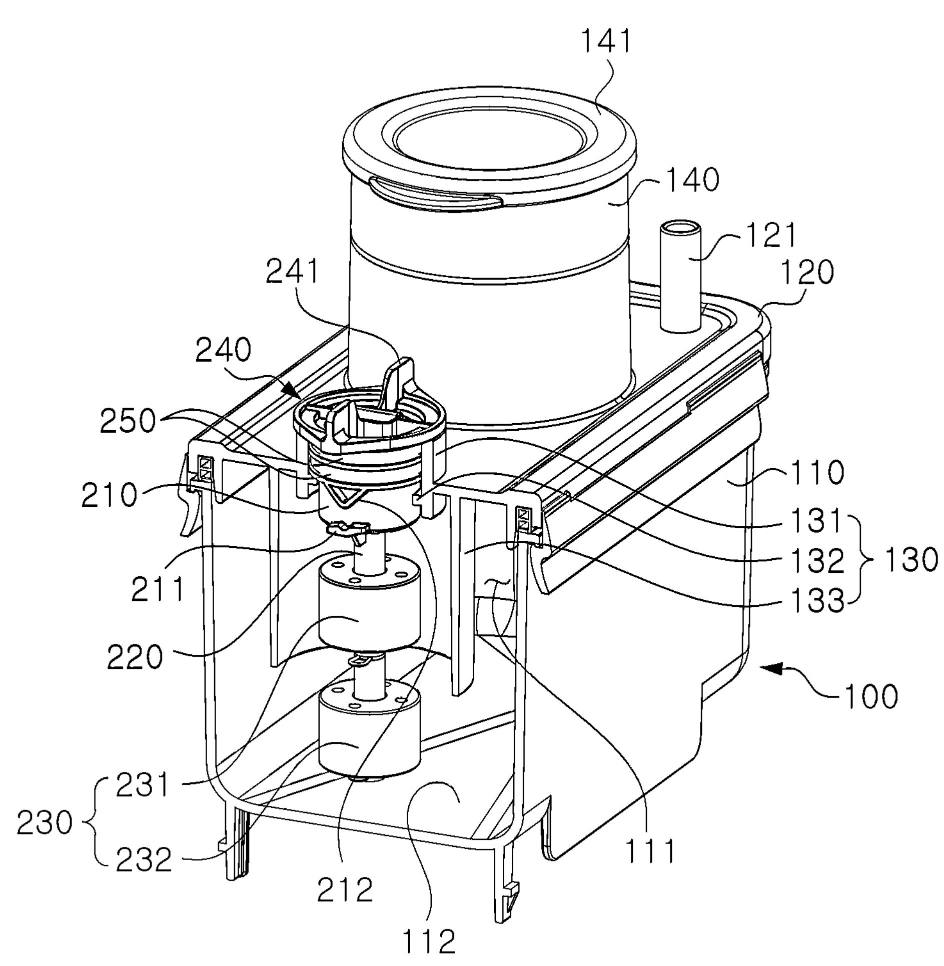
FIG. 3 is a cutaway view of the feed tank equipped with a packing structure of a float sensor according to an exemplary embodiment of the present disclosure illustrated in FIG. 2.
Figure 4:
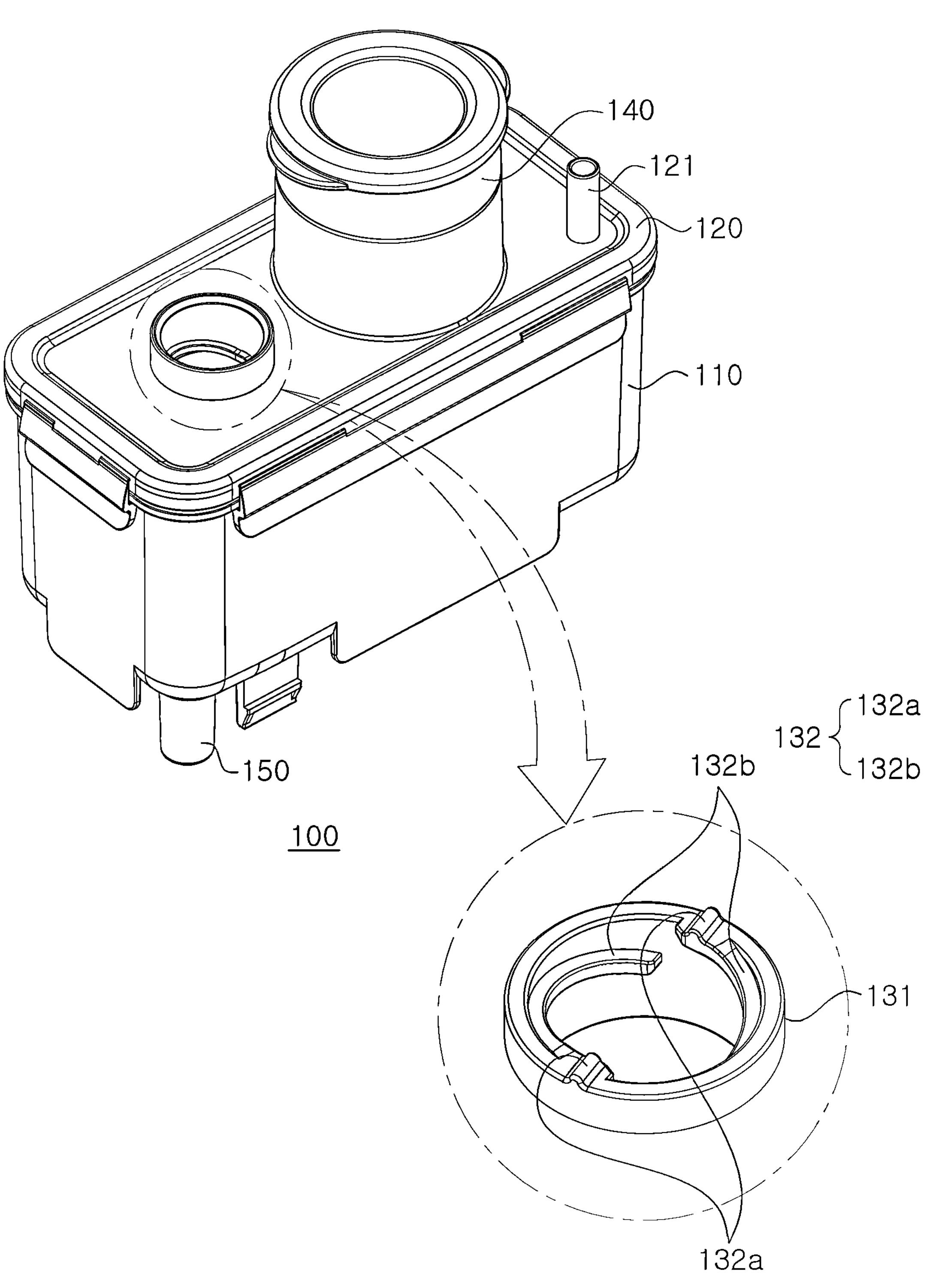
FIG. 4 is a schematic perspective view of a feed tank according to an exemplary embodiment of the present disclosure and a partially enlarged view illustrating an inverted portion according to an exemplary embodiment of the present disclosure.
Figure 5:
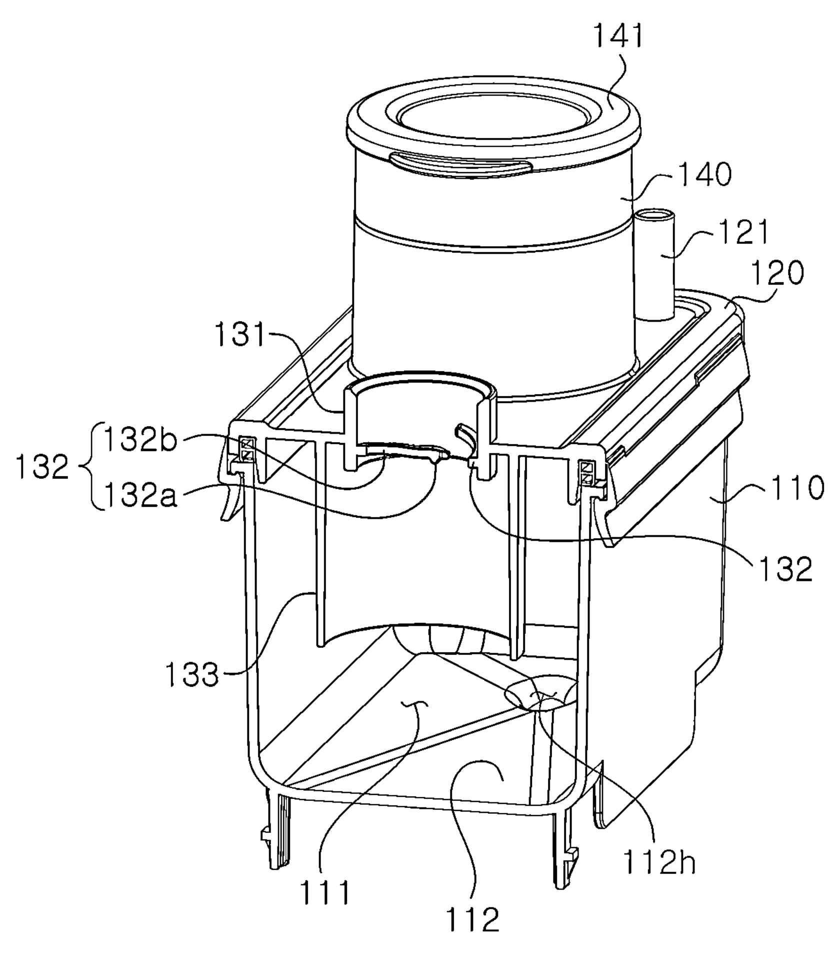
FIG. 5 is a cutaway view of the feed tank according to an exemplary embodiment of the present disclosure illustrated in FIG. 4.

FIGS. 2 to 5 illustrate a feed tank equipped with a packing structure of a float sensor according to an exemplary embodiment of the present disclosure. More specifically, FIG. 2 is a schematic perspective view of a feed tank equipped with a packing structure of a float sensor according to an exemplary embodiment of the present disclosure, FIG. 3 is a cutaway view of FIG. 2, FIG. 4 is a schematic perspective view of a feed tank according to an exemplary embodiment of the present disclosure and a partially enlarged view illustrating an inverted packing portion according to an exemplary embodiment of the present disclosure, and FIG. 5 is a cutaway view of FIG. 4. Hereinafter, a feed tank equipped with a packing structure of a float sensor according to an exemplary embodiment of the present disclosure is described in detail with reference to FIGS. 2 to 5.

The feed tank equipped with a packing structure of a float sensor according to an exemplary embodiment of the present disclosure includes the feed tank 100 in which ice-making water is stored and the float sensor 200 detecting a level of the ice-making water inside the feed tank 100. More specifically, the feed tank 100 according to an exemplary embodiment of the present disclosure includes a storage portion 110, a cover portion 120, and a packing portion 130. The storage portion 110 may include a storage space 111 in which ice-making water is stored and an inclined surface 112 allowing the stored ice-making water to flow toward the supply hole **112*h*. Here, since the supply hole 112*h* is formed in the inclined surface 112, the ice-making water may be guided toward the supply hole 112*h* along the inclined surface 112. Furthermore, the overflow line 150 may be provided in communication with one side of the storage space 111 to drain the ice-making water overflowing from the storage space 111 to the outside. The cover portion 120 may be detachably coupled to an upper surface of the storage portion 110. The water supply pipe 121 connected to a water source (not shown) may penetrate through the upper surface of the cover portion 120, and a cylindrical hollow pipe 140 and a cover member 141 cover covering the open upper surface of the hollow pipe 140** may be further provided.

The packing portion 130 includes a hollow packing member 131 provided to penetrate through one surface of the cover portion 120 and a fixing member 132 extending in a spiral direction along at least a portion of the inner circumferential surface of the packing member 131. Here, the float sensor 200 according to an exemplary embodiment of the present disclosure may be inserted into the packing portion 130 and may detect the level of the ice-making water. Here, the packing member 131 may have a cylindrical shape, may have a shape corresponding to the float sensor 200, and may be provided to surround a head portion 210 of the float sensor 200.

Here, the float sensor 200 according to an exemplary embodiment of the present disclosure may be rotated to be coupled to or separated from the packing portion 130. That is, when the float sensor 200 is rotated in a first direction along a circumferential direction, the float sensor 200 may be coupled to the fixing member 132 and fixed to the packing portion 130, and when the float sensor 200 is rotated in a second direction, opposite to the first direction, along the circumferential direction, the float sensor 200 may be separated from the fixing member 132 and separated from the packing portion 130. For example, the first direction may be a clockwise direction, and the second direction may be a counterclockwise direction.

The feed tank 100 according to an exemplary embodiment of the present disclosure may be provided so that the fixing member 132 surrounds a portion of the outer circumferential surface of the float sensor 200 on the inside of the packing member 131. That is, the fixing member 132 may be provided in a space between the packing member 131 and the float sensor 200 and may be provided to surround a portion of the outer circumferential surface of the float sensor 200.

In addition, the fixing member 132 according to an exemplary embodiment of the present disclosure may include a protrusion 132*a* provided at one end connected to the packing member 131 and protruding toward the storage space 111. The protrusion 132*a* may allow an arresting member 211 of the float sensor 200, which is to be described below, to be caught therein, thereby fixing the floating sensor 200 to the inside of the packing portion 130. Furthermore, the fixing member 132 may further include a fixing hook 132*b* extending in the spiral direction from the one end toward the outside facing the storage space 111, and the fixing hook 132*b* may be provided separately from the packing member 131.

Meanwhile, the packing portion 130 according to an exemplary embodiment of the present disclosure may further include a partition member 133 provided to surround the float sensor 200 within the storage space 111. The partition member 133 may be provided to surround a body portion 220 of the float sensor 200, which are to be described below, and may have a hollow cylindrical shape having a larger diameter than the packing member 131.

According to the structure of the packing portion 130 according to an exemplary embodiment of the present disclosure, since the fixing member 132 includes the protrusion 132*a* at one end thereof, the fixing member 132 may be caught in the arresting member 211 of the float sensor without a separate fixing device, such as a screw to fix the float sensor to the packing portion 130, and since the fixing hook 132*b* has a spiral structure, the fixing hook 132*b* may rotate to separate the float sensor 200 from the packing portion 130.

The float sensor 200 according to an exemplary embodiment of the present disclosure may include the head portion 210, the body portion 220, and a lifting portion 230. The head portion 210 may be provided inside the packing portion 130, the body portion 220 may extend from the head portion 210 within the storage space 111, and the lifting portion 230 may include a plurality of lifting members 231 and 232 and may be coupled to the body portion 220 to be raised and lowered according to the level of ice-making water in the storage space 111. Here, the packing portion 130 is provided to surround the head portion 210. Here, the plurality of lifting members 231 and 232 may be divided by a partition portion 260 (see FIG. 6). For example, a first lifting member 231 may be lifted and lowered from the first partition member 261 (see FIG. 6) to a lower end of the head portion 210 by a first partition member 261 (see FIG. 6), and a second lifting member 232 may be lifted and lowered from a second partition member 262 (see FIG. 6) to the first partition member 261 (see FIG. 6) by a second partition member 262 (see FIG. 6). Accordingly, the first lifting member 231 may detect a full water level, and the second lifting member 232 may detect a low water level.

Meanwhile, the float sensor 200 according to an exemplary embodiment of the present disclosure may further include a handle portion 240 provided above the head portion 210 to cover an open upper surface of the packing member 131 and having an extended handle 241. The handle portion 240 may form a sealing structure with the packing member 131, and a user may easily rotate or move the float sensor 200 by gripping the handle 241. For example, the user may hold the handle 241 and rotate the float sensor 200 in the first direction to fix the float sensor 200 to the packing portion 130, and may rotate the float sensor 200 in the second direction to separate the fixed float sensor from the packing portion 130.

Furthermore, the float sensor 200 according to an exemplary embodiment of the present disclosure may include the head portion 210 provided on an outer surface thereof and may further include the arresting member 211 having an arresting recess formed to allow the protrusion 132*a* to be insertedly caught therein. In addition, the head portion 210 may further include a support member 212 provided on the outer surface and provided to contact the end of the fixing hook 132*b* so that the fixing hook 132*b* is supported. The support member 212 may have a triangular shape, and one surface thereof may be in contact with an end of the fixing hook 132*b*. That is, in the float sensor 200, the arresting member 211 is caught to be fixed to the protrusion 132*a* located at one end of the fixing member 132 and the end of the fixing hook 132*b* located at the other end of the fixing member 132 may contact the support member 212 to be supported.

Meanwhile, the arresting member 211 and the support member 212 may be provided to correspond to the number of the fixing members 132, and as illustrated in the drawing, the feed tank equipped with a packing structure of a float sensor according to an exemplary embodiment of the present disclosure may include two arresting members 211 and two support members 212 respectively connected to two fixing members 132. In addition, a pair of the arresting member 211 and the support member 212 may be provided side by side in a height direction, and each pair may be located spaced apart on an outer surface of the head portion 210.

Here, the protrusion 132*a* of one fixing member 132 may be caught in and fixed by the arresting member 211 located on one side, and the end of the fixing hook 132*b* may contact and be supported by the support member 212 located on the other side. On the contrary, the protrusion 132*a* of the other fixing member 132 may be caught in and fixed by the arresting member 211 located on the other side, and the end of the fixing hook 132*b* may contact and be supported by the support member 212. However, of course, the number of fixing member 132, the arresting member 211, and the support member 212 may be applied without limitation.

Furthermore, the float sensor 200 according to an exemplary embodiment of the present disclosure includes a sealing recess (not shown) formed on an outer surface of the head portion 210 and a sealing member 250 provided in the sealing recess (not shown). The sealing member 250 may be provided between the packing portion 130 and the head portion 210 to form a sealing structure of the float sensor 200.

Figure 6:
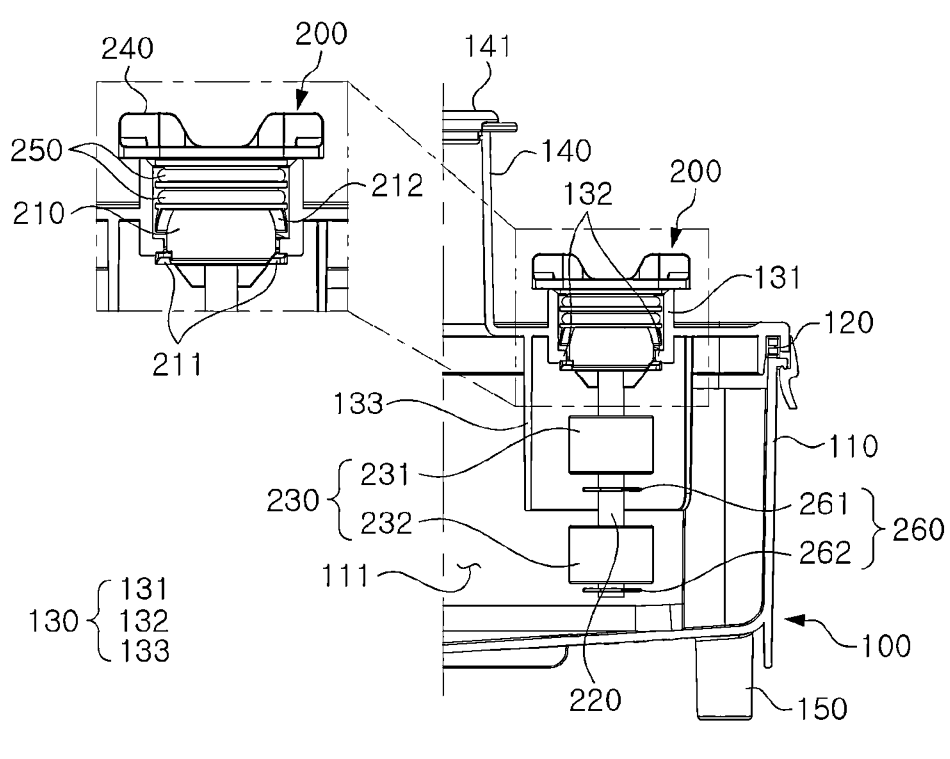
FIG. 6 is a diagram illustrating a usage state of a feed tank equipped with a packing structure of a float sensor according to an exemplary embodiment of the present disclosure.
Figure 6:
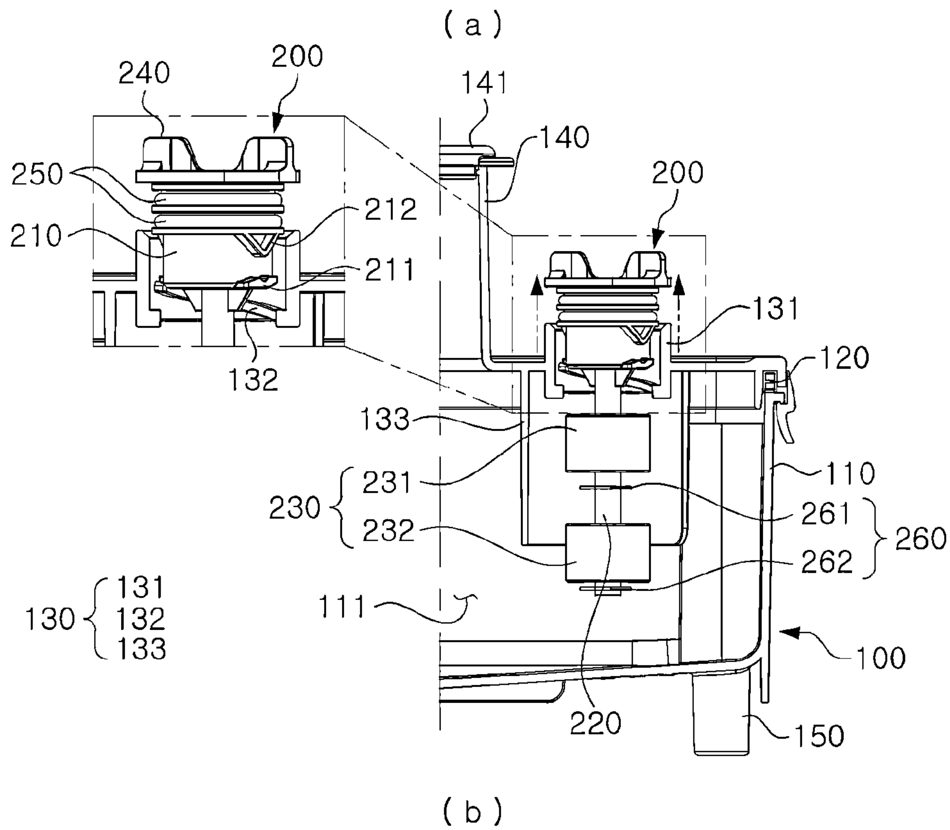

FIG. 6 illustrates a usage state of a feed tank equipped with a packing structure of a float sensor according to an exemplary embodiment of the present disclosure. FIG. 6(*a*) illustrates a state in which the float sensor 200 is fixed to the packing portion 130, and FIG. 6(*b*) illustrates a state in which the float sensor 200 is separated from the packing portion 130.

Referring to FIG. 6(*a*), the float sensor 200 is fixed to the packing portion 130. More specifically, the protrusion 132*a* (see FIG. 4) of the fixing member 132 is caught in the arresting recess of the arresting member 211, and the fixing hook 132*b* (see FIG. 4) of the fixing member 132 is provided to surround the outer circumferential surface of the head portion 210 and contacts and is supported by the support member 212. Accordingly, the float sensor 200 may be fixed inside the packing portion 130 and maintain a sealed state.

Referring to FIG. 6(*b*), as the float sensor 200 rotates in the circumferential direction, the protrusion 132*a* (see FIG. 4) of the fixing member 132 may escape from the arresting recess of the arresting member 211 and the fixing hook 132*b* (see FIG. 4) of the fixing member 132 may be moved to be spaced apart from the support member 212, and accordingly, the float sensor 200 may be easily separated from the packing portion 130.

Therefore, according to the feed tank equipped with a packing structure of a float sensor according to an exemplary embodiment of the present disclosure, the weak point of the float sensor 200 regarding water overflow or contamination may be resolved as the sealing structure is formed inside the packing portion 130, and since the fixing member 132, the arresting member 211, and the support member 212 may be coupled and separated by rotating the float sensor 200, the float sensor 200 may be easily attached and detached and may be easily assembled and separated.

Through the feed tank equipped with a packing structure of a float sensor and the structure of the ice maker including the same according to the present disclosure described above, the float sensor may be easily assembled and separated and a sealed state for contamination prevention and waterproof may be maintained.

While exemplary embodiments have been illustrated and described above, it will be apparent to those skilled in the art that modifications and variations could be made without departing from the scope of the present disclosure as defined by the appended claims.

What is claimed is:

1. A feed tank equipped with a packing structure of a float sensor, the feed tank comprising:

a feed tank including a storage portion provided with a storage space in which ice-making water is stored, a cover portion detachably coupled to an upper surface of the storage portion, and a packing structure including a hollow packing housing provided to penetrate through one surface of the cover portion and a fixing structure extending in a spiral direction along at least a portion of an inner circumferential surface of the packing housing; and a float sensor inserted into the packing housing and detecting a level of the ice-making water, wherein the fixing structure includes a protrusion provided at one end thereof and protruding toward the storage space, and a hook extending in the spiral direction from the protrusion and spaced apart from the packing housing, wherein the float sensor is configured to be fixed to or separated from the fixing structure by rotation of the float sensor relative to the packing housing, wherein the float sensor includes a head portion disposed within the packing housing, wherein the head portion includes a recess into which the protrusion is inserted and caught, and a support portion configured to contact and support an end of the hook, wherein the packing housing is configured to surround the head portion, and wherein the float sensor further includes a sealing member provided on an outer surface of the head portion to seal between the head portion and the packing housing.

2. The feed tank of claim 1, wherein the float sensor is rotated relative to the packing housing to be fixed to or separated from the fixing structure.

3. The feed tank of claim 2, wherein the fixing structure is provided to surround a portion of an outer circumferential surface of the float sensor-inside the packing housing.

4. The feed tank of claim 3, wherein the fixing structure includes the protrusion provided at one end thereof and protruding toward the storage space.

5. The feed tank of claim 4, wherein the fixing structure further includes the fixing hook extending in the spiral direction from the one end toward the outside facing the storage space;

wherein the fixing hook is provided separately from the packing housing.

6. The feed tank of claim 5, wherein the float sensor includes:

a head portion provided inside the packing housing;

a body portion extending from the head portion within the storage space; and a lifting portion coupled to the body portion and raised and lowered according to the level of the ice-making water in the storage space.

7. The feed tank of claim 6, wherein the float sensor further includes a handle portion provided above the head portion to cover an open upper surface of the packing housing, the handle portion including a handle extending upward.

8. The feed tank of claim 7, wherein the head portion further includes an arresting member provided on an outer surface thereof and including an arresting recess to allow the protrusion to be inserted into and caught therein.

9. The feed tank of claim 8, wherein the head portion further includes a support member provided on the outer surface thereof and contacting an end of the fixing hook so that the fixing hanger is supported.

10. The feed tank of claim 9, wherein the float sensor further includes:

a sealing recess formed on the outer surface of the head portion; and the sealing member provided in the sealing recess.

11. An ice maker comprising:

an ice generating unit generating ice by exchanging heat with a refrigerant;

an ice storage portion storing ice produced in the ice generating unit; and the feed tank equipped with a packing structure of a float sensor of claim 10, which receives ice-making water from a water source through a water supply pipe, stores received ice-making water, and supplies the stored ice-making water to the ice generating unit.

12. The ice maker of claim 11, wherein the ice generating unit includes:

a hollow cylinder;

an auger coaxially provided and rotating the cylinder inside the cylinder; and a refrigerant pipe formed to surround an outer circumferential surface of the cylinder and including a refrigerant inlet formed at one end and a refrigerant outlet formed at the other end with respect to a height direction of the cylinder.

* * * * *